United States Patent
Nissim et al.

(10) Patent No.: US 8,396,940 B2
(45) Date of Patent: Mar. 12, 2013

(54) NETWORK COMMUNICATIONS USING NON-NETWORKING DEVICE DRIVERS

(76) Inventors: Yoav Nissim, Pardes-Hanna (IL); Tal Kelrich, Ramat Hasharon (IL); Alexey Polonsky, Netanya (IL); Chen Yosef, Tel Aviv (IL); Ilya Lifshitz, Kadima (IL); Ophir Herbst, Herzliya (IL)

(*) Notice: Subject to any disclaimer, the term of this patent is extended or adjusted under 35 U.S.C. 154(b) by 309 days.

(21) Appl. No.: 12/790,827

(22) Filed: May 30, 2010

(65) Prior Publication Data

US 2010/0306341 A1 Dec. 2, 2010

Related U.S. Application Data

(60) Provisional application No. 61/183,367, filed on Jun. 2, 2009.

(51) Int. Cl.
 *G06F 15/16* (2006.01)
(52) U.S. Cl. ......... 709/217; 709/238; 709/239; 719/321
(58) Field of Classification Search .................. 709/217, 709/238, 239; 719/321
See application file for complete search history.

(56) References Cited

U.S. PATENT DOCUMENTS

| | | | |
|---|---|---|---|
| 8,107,469 B2 * | 1/2012 | Jain et al. | 370/389 |
| 2001/0042112 A1 | 11/2001 | Slivka et al. | |
| 2004/0221298 A1 | 11/2004 | Cedola | |
| 2006/0291433 A1 | 12/2006 | Do et al. | |
| 2008/0225827 A1 * | 9/2008 | Jain et al. | 370/351 |
| 2008/0225851 A1 * | 9/2008 | Jain | 370/392 |
| 2008/0225869 A1 * | 9/2008 | Singh et al. | 370/401 |
| 2010/0050189 A1 * | 2/2010 | Sng | 719/321 |

* cited by examiner

*Primary Examiner* — Mohamed Wasel
(74) *Attorney, Agent, or Firm* — Daniel J. Swirsky; AlphaPatent Associates Ltd.

(57) ABSTRACT

A system for communicating via a network, the system including a non-networking device driver running on a computer, and networking/non-networking apparatus configured to receive, from the non-networking device driver, data that are designated by an application for transmission via a computer network, and transmit the data via the computer network responsive to receipt of the data from the non-networking device driver, where the networking/non-networking apparatus includes a non-networking device impersonator configured to be identified by the computer as a non-networking device, and to receive data from the non-networking device driver, and a network adapter configured to receive the data from the non-networking device impersonator and transmit the data via the computer network.

11 Claims, 4 Drawing Sheets

NETWORK COMMUNICATIONS USING NON-NETWORKING DEVICE DRIVERS

CROSS-REFERENCE TO RELATED APPLICATIONS

This application claims priority benefit of U.S. Provisional Patent Application No. 61/183,367, filed Jun. 2, 2009, the contents of which are incorporated herein by reference in their entirety.

FIELD OF THE INVENTION

The present invention relates to computer network communications in general, and more particularly to facilitating network communications using non-networking device drivers.

BACKGROUND OF THE INVENTION

Many computer systems allow only privileged users, such as administrators, to install certain types of software. As a result, regular, non-privileged users may be hindered from taking full advantage of the capabilities of a given computer system. For example, installing a network adapter on a computer typically requires installing one or more device drivers on the computer to enable communications between the computer and the network adapter, thereby enabling the computer to communicate with a computer network via the network adapter. However, non-privileged users are typically prevented from installing network adapters.

SUMMARY OF THE INVENTION

In another aspect of the invention a method is provided for communicating via a network, the method including receiving, from a non-networking device driver configured to communicate with a non-networking device, data that are designated by an application for transmission via a computer network, and transmitting the data via the computer network responsive to receipt of the data from the non-networking device driver.

In another aspect of the invention the receiving and transmitting steps are performed by networking/non-networking apparatus configured to be recognized by a computer as a non-networking device.

In another aspect of the invention the method further includes receiving, via the computer network, data that are designated for the application, and forwarding to the application, via the non-networking device driver, the data received via the computer network.

In another aspect of the invention a method is provided for communicating via a network, the method including routing data from an application to a non-networking device driver, where the data are designated by the application for transmission via a computer network, and forwarding the data from the non-networking device driver to a networking/non-networking apparatus in a format that is predefined for use with a non-networking device.

In another aspect of the invention the method further includes identifying the networking/non-networking apparatus as a non-networking device when the networking/non-networking apparatus is connected to a computer.

In another aspect of the invention the method further includes identifying the networking/non-networking apparatus as a data storage device when the networking/non-networking apparatus is connected to a computer.

In another aspect of the invention the method further includes receiving at the non-networking device driver data designated for delivery to the application, and forwarding to the application the data designated for delivery to the application.

In another aspect of the invention a system is provided for communicating via a network, the system including a non-networking device driver running on a computer, and networking/non-networking apparatus configured to receive, from the non-networking device driver, data that are designated by an application for transmission via a computer network, and transmit the data via the computer network responsive to receipt of the data from the non-networking device driver.

In another aspect of the invention the networking/non-networking apparatus further includes a non-networking device impersonator configured to be identified by the computer as a non-networking device, and to receive the data from the non-networking device driver, and a network adapter configured to receive the data from the non-networking device impersonator and transmit the data via the computer network.

In another aspect of the invention the networking/non-networking apparatus is further configured to receive, via the computer network, data that are designated for the application, and forward to the application, via the non-networking device driver, the data received via the computer network.

In another aspect of the invention the system further includes a network data rerouter configured to route the data from the application to the non-network device driver.

In another aspect of the invention a system is provided for communicating via a network, the system including a non-networking device impersonator configured to be identified by a computer as a non-networking device, and to receive data from a non-networking device driver running on the computer, and a network adapter configured to receive the data from the non-networking device impersonator and transmit the data via a computer network.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
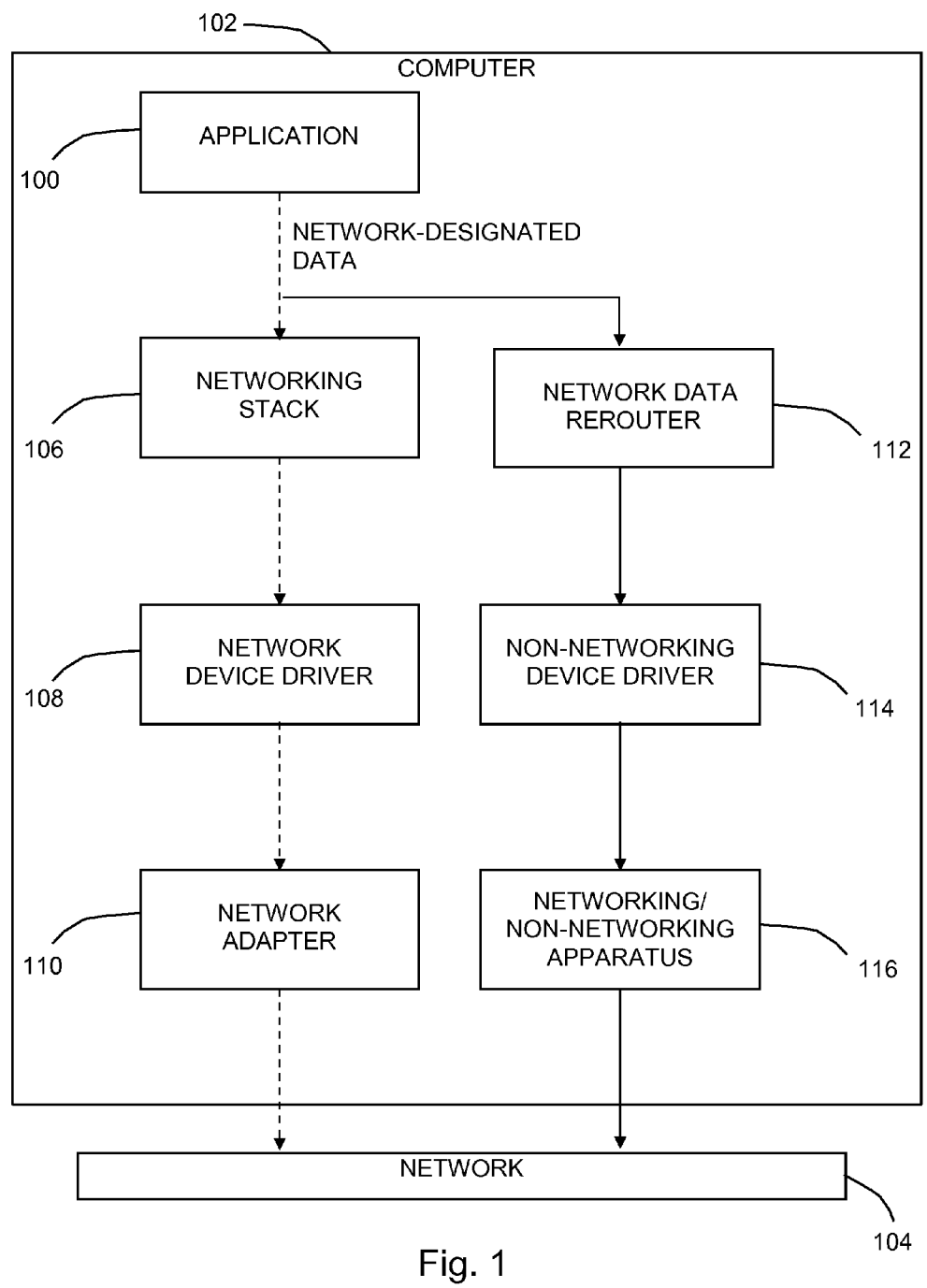
FIG. 1 is a simplified conceptual illustration of a system for network communications via non-networking device drivers, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for network communications via non-networking device drivers, constructed and operative in accordance with an embodiment of the invention. In the system of FIG. 1, an application 100, such as Microsoft Internet Explorer™ running on a computer 102 designates data for transmission via a computer network 104, such as the Internet. A networking stack 106, such as may be provided by the Microsoft Windows™ operating system, receives the data designated by application 100 for transmission via computer network 104, and forwards it to a network device driver 108. Network device driver 108 then forwards the data to a network adapter 110, which then transmits the data via computer network 104. In the system of FIG. 1 the installation of network device driver 108 typically may only be performed by a privileged user, such as a user designated as an administrator.

As an alternative to using networking stack 106 and network device driver 108 to facilitate communications between computer 102 and computer network 104, application 100 designates data for transmission via computer network 104 in a manner similar to that described above. However, instead of forwarding the network-designated data for transmission via networking stack 106 and network device driver 108, a network data rerouter 112 is preferably provided, where network data rerouter 112 is configured to reroute network-designated data from application 100 to a non-networking device driver 114. Non-networking device driver 114 may be any device driver that supports a computer-connected device that does not act as a network adapter, and preferably where non-networking device driver 114 is already installed on computer 102, such as where non-networking device driver 114 is a Microsoft Windows™ "inbox" driver. In one embodiment communication between application 100 and networking stack 106 is intercepted by network data rerouter 112, such as by using a DLL injection technique. In another embodiment application 100 is configured to provide network-designated data to a proxy server, where network data rerouter 112 is configured as a proxy server. Network data rerouter 112 is preferably configured to provide the network-designated data in a format that is predefined for use with non-networking device driver 114. Non-networking device driver 114 receives the network-designated data from network data rerouter 112 and forwards the data to networking/non-networking apparatus 116. Networking/non-networking apparatus 116 is configured to be identified by computer 102 as a non-networking device, such as a camera. Non-networking device driver 114 preferably forwards network-designated data to networking/non-networking apparatus 116 in a format that is predefined for use with non-networking devices, such as in a data format known for use with computer-connected cameras.

Although networking/non-networking apparatus 116 is configured to be identified by computer 102 as a non-networking device, networking/non-networking apparatus 116 is also configured to operate as a network adaptor, where networking/non-networking apparatus 116 receives network-designated data from non-networking device driver 114 and transmits the data via computer network 104. However, although networking/non-networking apparatus 116 is configured to operate as both a non-networking device and a network adaptor, networking/non-networking apparatus 116 is configured such that it is only identified by computer 102 as a non-networking device, and is not identified by computer 102 as a network adaptor.

Networking/non-networking apparatus 116 is also preferably configured to receive data from computer network 104 and forward the data to non-networking device driver 114, preferably in a format that is predefined for use with non-networking device drivers. Non-networking device driver 114 is preferably configured to receive data from networking/non-networking apparatus 116, and forward the data to application 100, such as via network data rerouter 112.

Figure 2A:
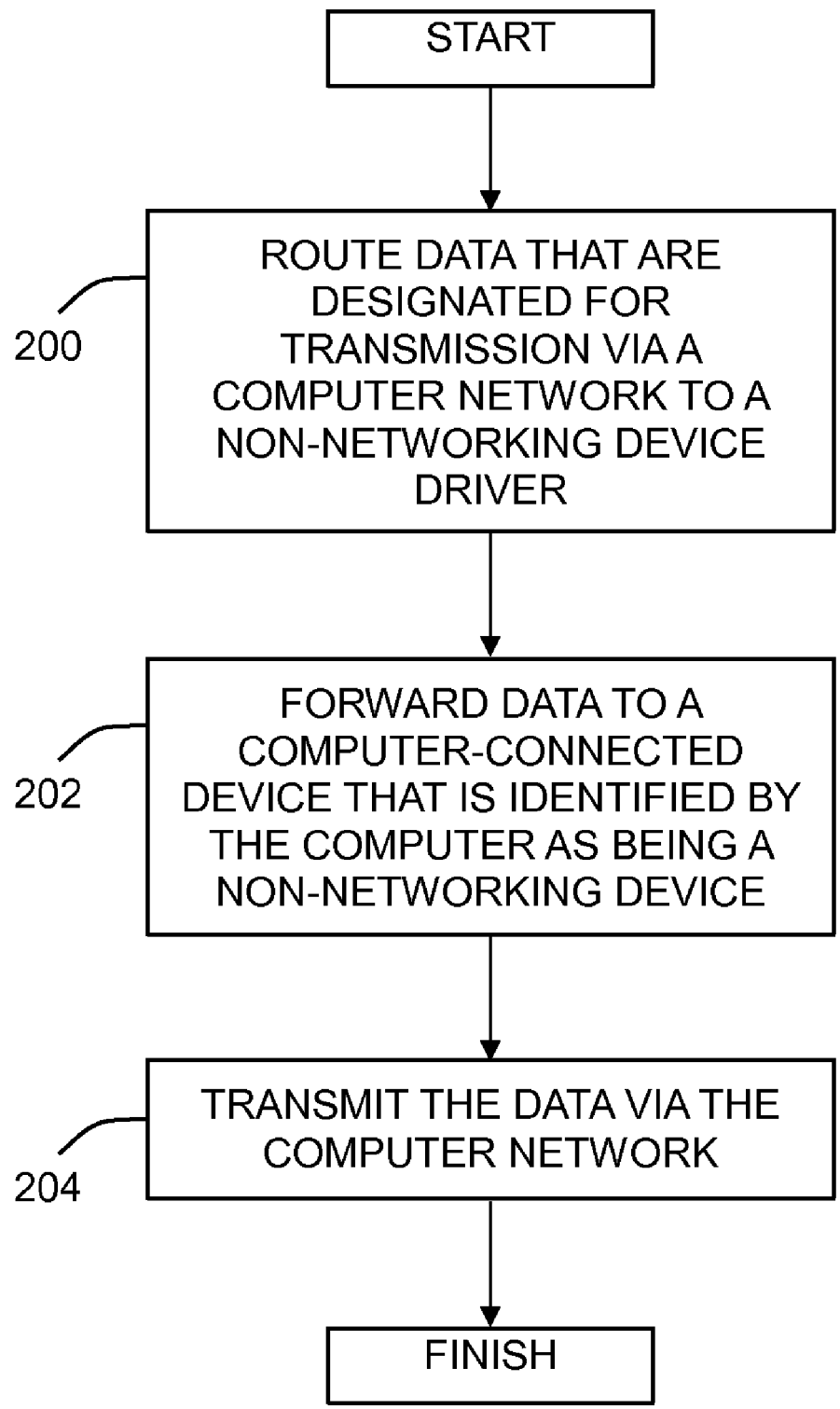
FIGS. 2A and 2B are simplified flowchart illustrations of exemplary methods of operation of the system of FIG. 1, operative in accordance with an embodiment of the invention.
Figure 2B:
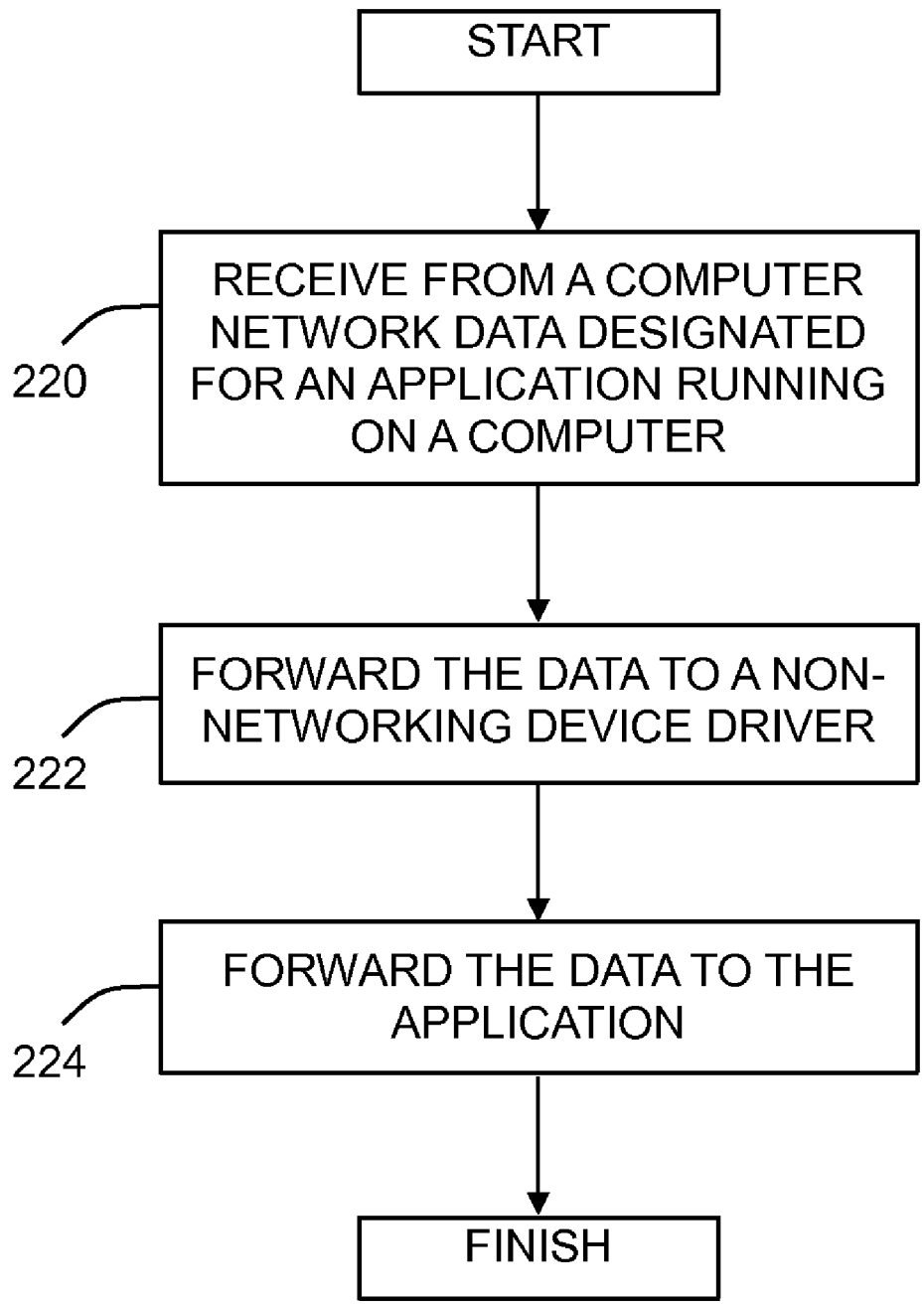

Reference is now made to FIGS. 2A and 2B, which are flowchart illustrations of exemplary methods of operation of the system of FIG. 1, operative in accordance with an embodiment of the invention. In the method of FIG. 2A, data that are designated for transmission via a computer network are routed to a non-networking device driver on a computer (step 200). The data are then forwarded by the non-networking device driver to a device that is both connected to the computer and identified by the computer as being a non-networking device (step 202). The data are then transmitted by the device via the computer network (step 204).

In FIG. 2B, data designated for delivery to an application running on a computer are received from a computer network at a device that is both connected to the computer and identified by the computer as being a non-networking device (step 220). The data are then forwarded by the device to a non-networking device driver on the computer (step 222). The data are then provided to the application (step 224).

Figure 3:
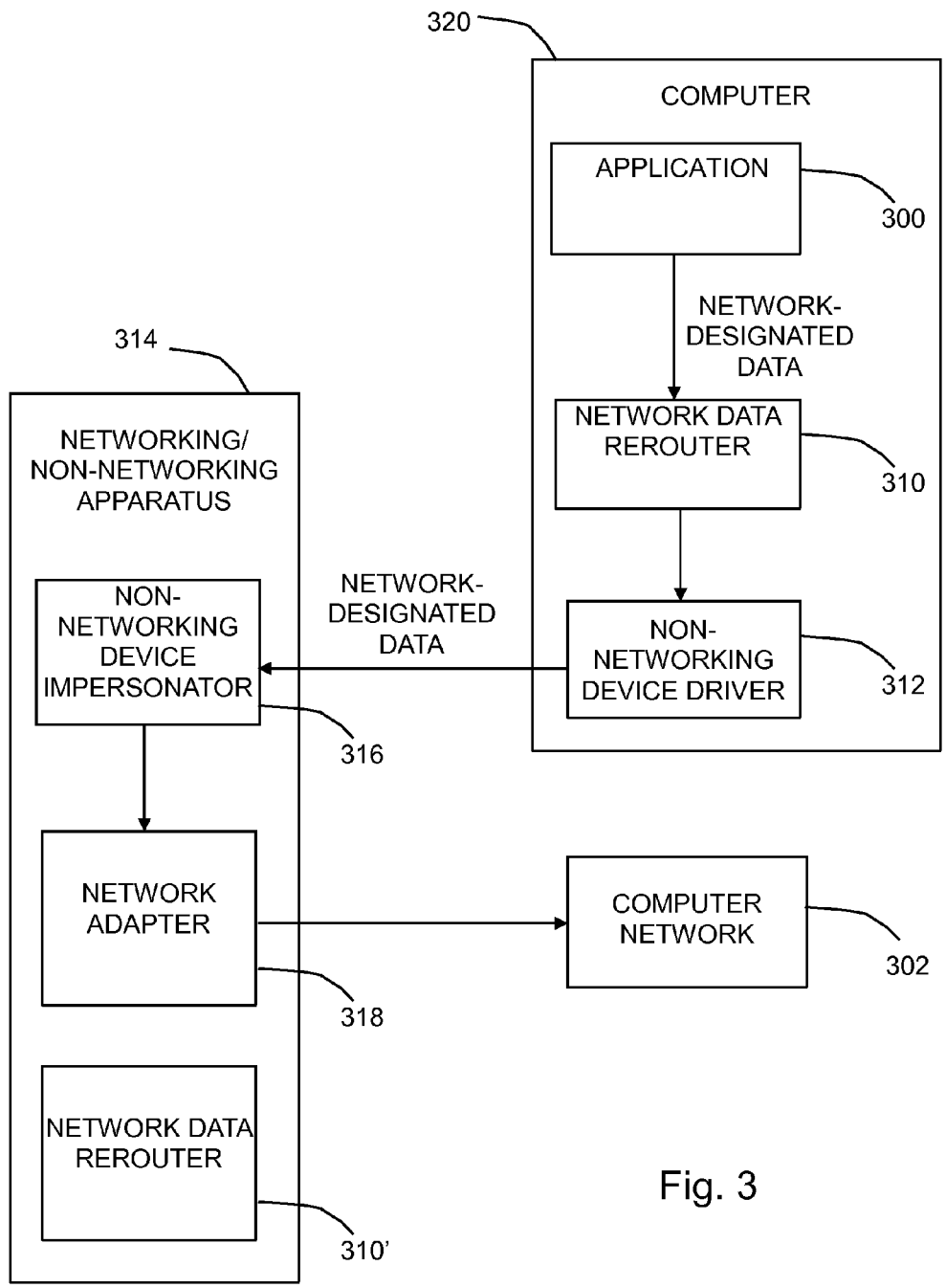
FIG. 3 is a simplified conceptual illustration of a system for network communications via non-networking device drivers, constructed and operative in accordance with an embodiment of the invention.

Reference is now made to FIG. 3 which is a simplified conceptual illustration of a system for network communications via non-networking device drivers, constructed and operative in accordance with an embodiment of the invention. In the system of FIG. 3, networking/non-networking apparatus 314 is preferably connected to a computer 320, such as where networking/non-networking apparatus 314 is configured as a hot-pluggable Plug-and-Play (PNP) device. Networking/non-networking apparatus 314 preferably includes a non-networking device impersonator 316 which enables networking/non-networking apparatus 314 to be identified by computer 320 as a non-networking device, such as a camera. Non-networking device impersonator 316 is preferably configured to receive from a non-networking device driver 312 running on computer 320 data that are designated for transmission via computer network 302, such as where the data are routed from an application 300 running on computer 320 to non-networking device driver 312 via a network data rerouter 310. The data are preferably received by non-networking device impersonator 316 in a format that is predefined for use with a non-networking device, such as a camera. Networking/non-networking apparatus 314 also preferably includes a network adapter 318 which is configured to transmit and receive data via a computer network 302. Non-networking device impersonator 316 preferably forwards the data to network adaptor 318, which formats the data for transmission via computer network 302 and then transmits the data via computer network 302.

Network adaptor 318 is also preferably configured to receive from computer network 302 data that are designated for delivery to application 300 running on computer 320. Network adaptor 318 forwards the data to non-networking device impersonator 316, which forwards the data to non-networking device driver 312, preferably in a format that is predefined for use with a non-networking device driver. Non-networking device driver 312 forwards the data to application 300, preferably via network data rerouter 310.

Optionally, networking/non-networking apparatus 314 may also be configured to be identified by computer 320 as a data storage device, such as a flash drive, on which a copy of network data rerouter 310 software may be stored, designated by reference numeral 310'. In this embodiment, networking/non-networking apparatus 314 may be configured using technology, such as Microsoft Windows™ Autorun™, to enable computer 320 to run network data rerouter 310'.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for communicating via a network, the method comprising:
   receiving, from a non-networking device driver configured to communicate with a non-networking device, data that are designated by an application for transmission via a computer network; and
   transmitting said data via said computer network responsive to receipt of said data from said non-networking device driver.

2. The method according to claim 1 wherein said receiving and transmitting steps are performed by networking/non-networking apparatus configured to be recognized by a computer as a non-networking device.

3. The method according to claim 1 and further comprising:
   receiving, via said computer network, data that are designated for said application; and
   forwarding to said application, via said non-networking device driver, said data received via said computer network.

4. A method for communicating via a network, the method comprising:
   routing data from an application to a non-networking device driver, wherein said data are designated by said application for transmission via a computer network; and
   forwarding said data from said non-networking device driver to a networking/non-networking apparatus in a format that is predefined for use with a non-networking device.

5. The method according to claim 4 and further comprising identifying said networking/non-networking apparatus as a non-networking device when said networking/non-networking apparatus is connected to a computer.

6. The method according to claim 4 and further comprising identifying said networking/non-networking apparatus as a data storage device when said networking/non-networking apparatus is connected to a computer.

7. The method according to claim 4 and further comprising:
   receiving at said non-networking device driver data designated for delivery to said application; and
   forwarding to said application said data designated for delivery to said application.

8. A system for communicating via a network, the system comprising:
   a non-networking device driver running on a computer; and
   networking/non-networking apparatus configured to
      receive, from said non-networking device driver, data that are designated by an application for transmission via a computer network, and
      transmit said data via said computer network responsive to receipt of said data from said non-networking device driver.

9. The system according to claim 8 wherein said networking/non-networking apparatus further comprises:
   a non-networking device impersonator configured to be identified by said computer as a non-networking device, and to receive said data from said non-networking device driver; and
   a network adapter configured to receive said data from said non-networking device impersonator and transmit said data via said computer network.

10. The system according to claim 8 wherein said networking/non-networking apparatus is further configured to
   receive, via said computer network, data that are designated for said application, and
   forward to said application, via said non-networking device driver, said data received via said computer network.

11. The system according to claim 8 and further comprising a network data rerouter configured to route said data from said application to said non-network device driver.

* * * * *